H. J. PILLIOD.
LOCOMOTIVE VALVE GEAR.
APPLICATION FILED MAY 2, 1910.
982,990.
Patented Jan. 31, 1911.
4 SHEETS—SHEET 1.
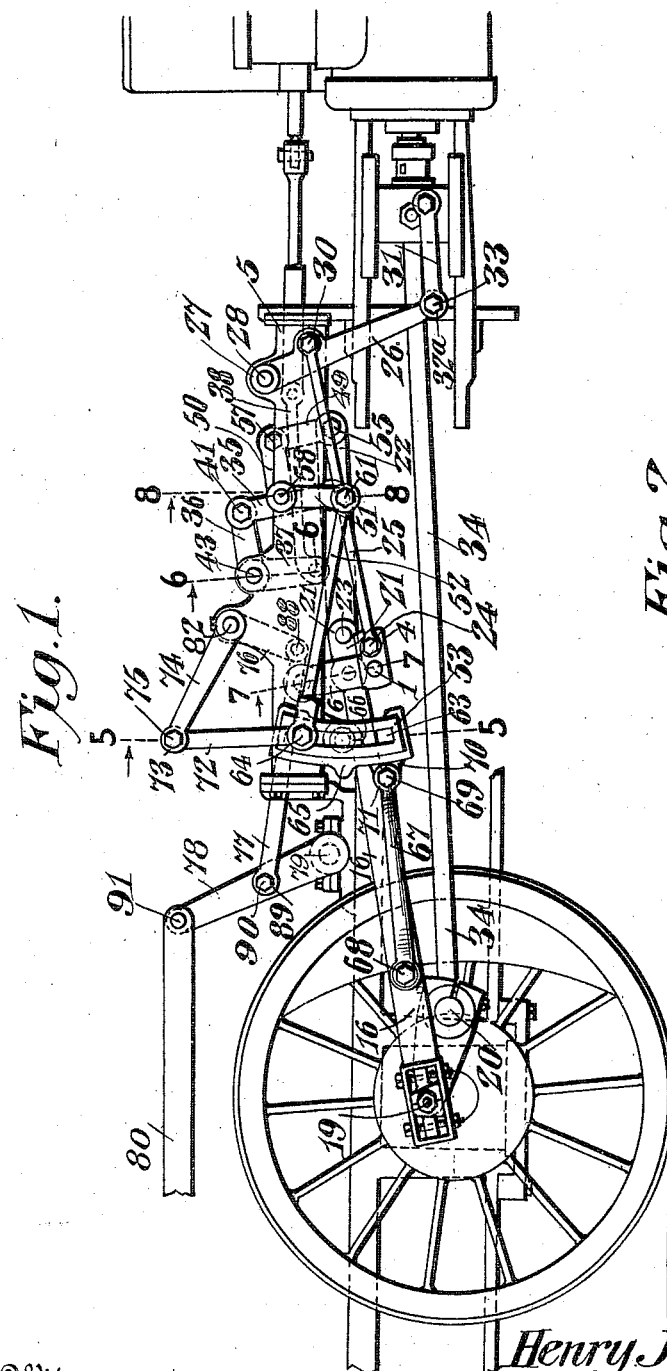
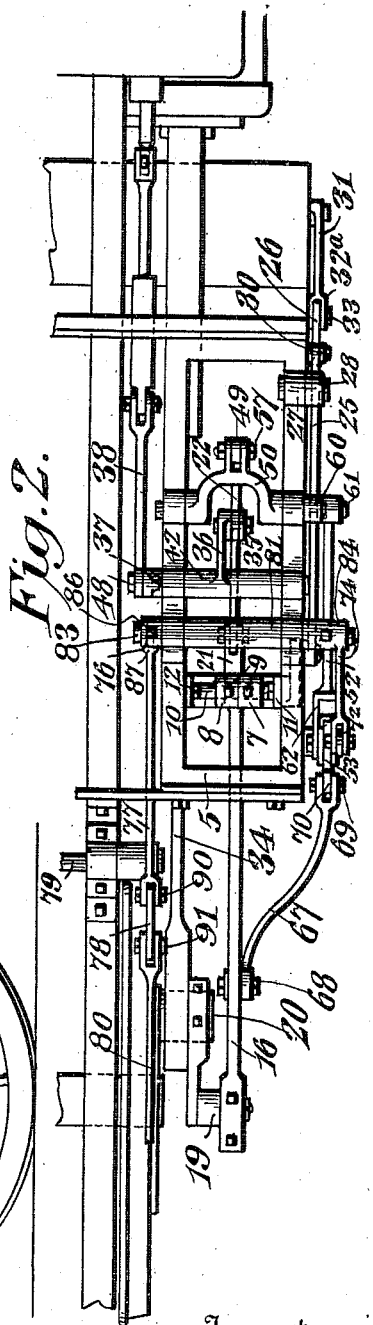
Henry J. Pilliod, Inventor
Witnesses
By
Attorney

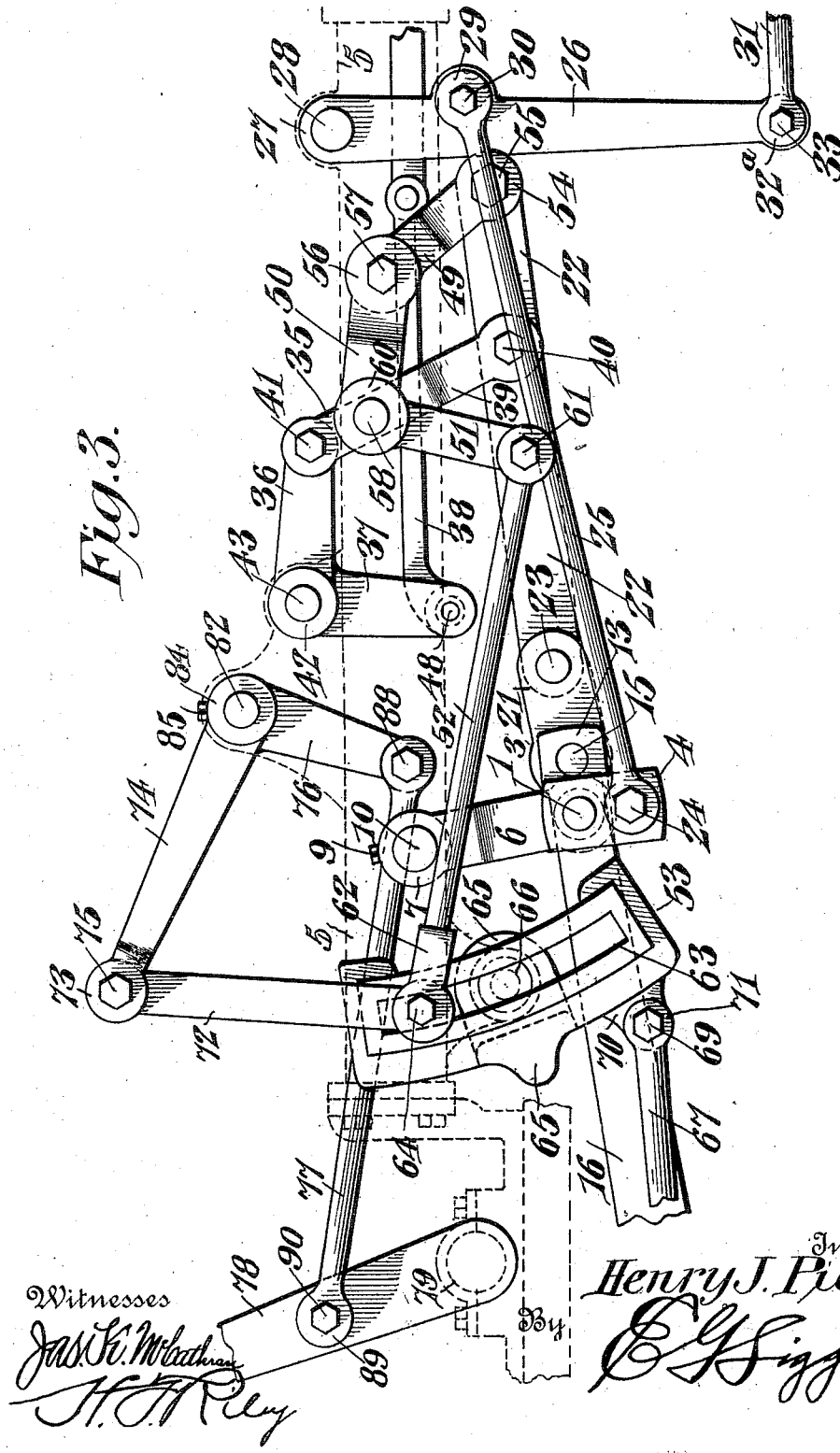

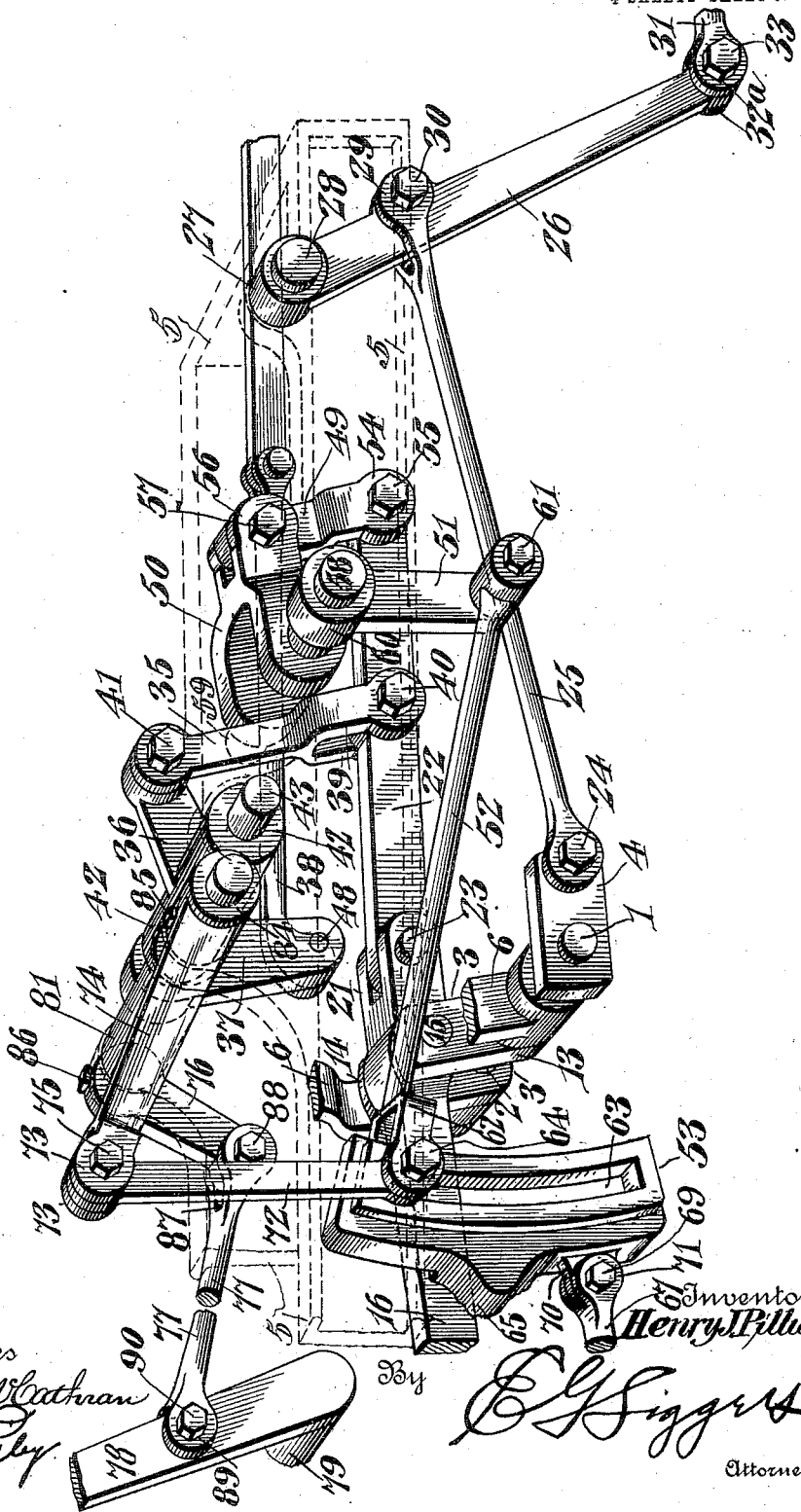

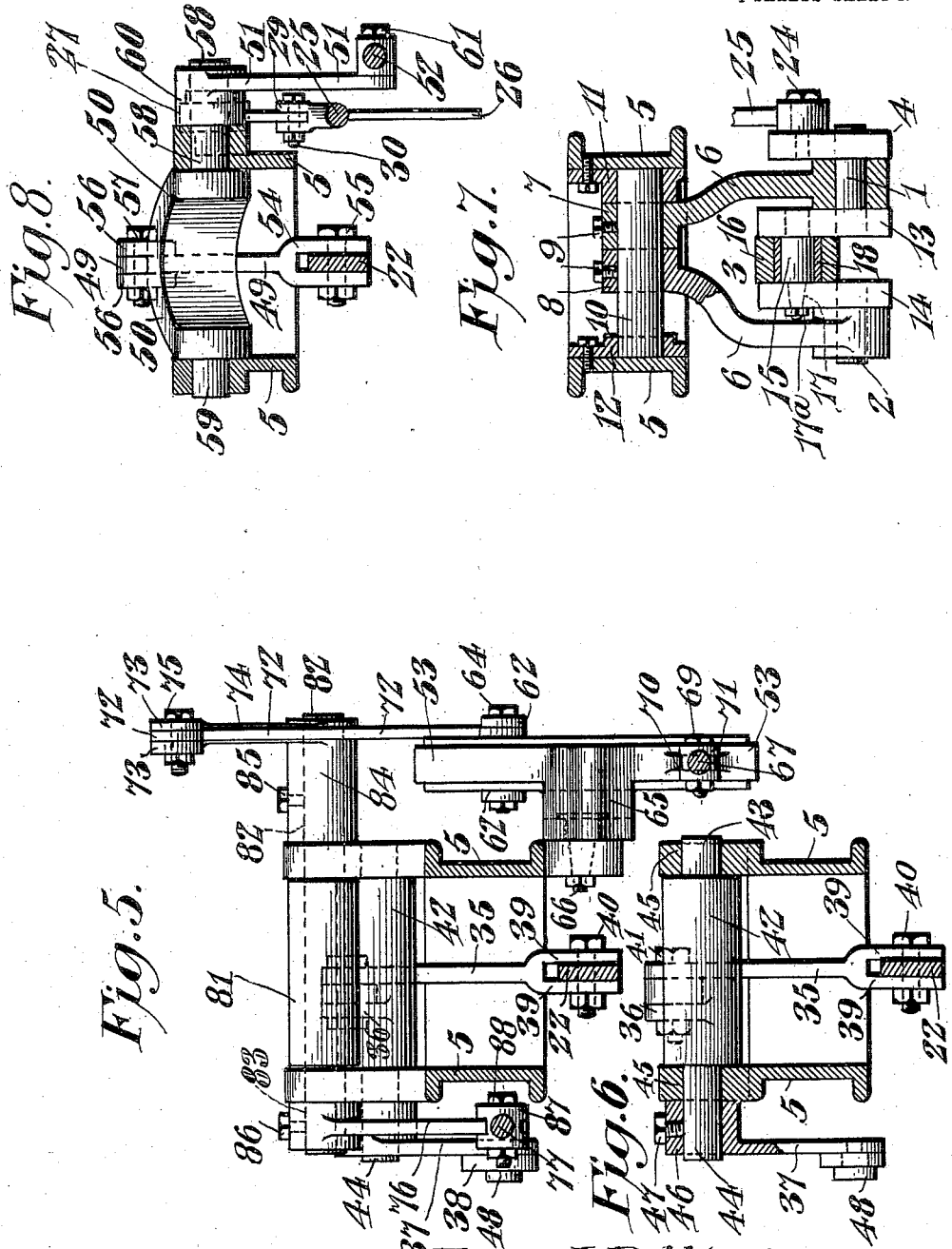

UNITED STATES PATENT OFFICE.

HENRY J. PILLIOD, OF CHICAGO, ILLINOIS, ASSIGNOR TO THE PILLIOD BROTHERS COMPANY, OF TOLEDO, OHIO.

LOCOMOTIVE VALVE-GEAR.

982,990.

Specification of Letters Patent. Patented Jan. 31, 1911.

Application filed May 2, 1910. Serial No. 558,823.

*To all whom it may concern:*

Be it known that I, HENRY J. PILLIOD, a citizen of the United States, residing at Chicago, in the county of Cook and State of Illinois, have invented a new and useful Locomotive Valve-Gear, of which the following is a specification.

The invention relates to improvements in locomotive valve gears.

The object of the present invention is to improve the construction of locomotive valve gears of the Walschaert type, and to provide a simple and easily accessible valve gear in which the evils of valve motion, viz., the unequal port opening, cut-off and release, due to the angularity of the eccentric arm will be corrected in this type of valve gear, and the travel of the valve equalized to produce uniform admission and release at each end of the cylinder and cut off at equidistant points from each end thereof.

With these and other objects in view, the invention consists in the construction and novel combination of parts hereinafter fully described, illustrated in the accompanying drawings, and pointed out in the claims hereto appended.

In the drawings:—Figure 1 is a side elevation of a portion of a locomotive, provided with valve gears, constructed in accordance with this invention. Fig. 2 is a plan view of the same. Fig. 3 is an enlarged side elevation of the valve gear. Fig. 4 is a perspective view of the same. Fig. 5 is a transverse sectional view on the line 5—5 of Fig. 1. Fig. 6 is a transverse sectional view on the line 6—6 of Fig. 1. Fig. 7 is a transverse sectional view on the line 7—7 of Fig. 1. Fig. 8 is a transverse sectional view on the line 8—8 of Fig. 1.

Like numerals of reference designate corresponding parts in all the figures of the drawings.

The specification is a disclosure of one form of the invention, while the claims define the actual scope of the invention.

In the embodiment of the invention illustrated in the accompanying drawings, the valve gear is equipped with an imparting motion device comprising a central pivot or shaft composed of two sections 1 and 2, and equipped with two cranks 3 and 4, arranged at an angle of ninety degrees. The sections 1 and 2 of the central shaft or pivot are hung from the gear frame 5 by a hanger 6, arranged at an angle of ninety degrees to the line of motion, and adapted to swing longitudinally to compensate for vibration and lateral motion of the engine to prevent such motion from fatally affecting the operation of the valve. The hanger 6 is composed of two sides or links, having their upper ends 7 and 8 fitted together and rigidly secured by set screws 9, or other suitable fastening devices, to a horizontally disposed transversely arranged pivot 10. The terminals of the pivot 10 are arranged in bearings of plates 11 and 12, secured by screws, or other suitable fastening devices to the inner faces of the sides of the gear frame 5. The pivot 10 partially rotates in the bearings of the plates 11 and 12 when the hanger oscillates.

The sides or links of the hanger 6 are laterally bent or off-set at an intermediate point to space their lower portions to receive the crank 3, which is composed of two arms 13 and 14, rigidly secured to the inner ends of the sections 1 and 2 of the central shaft or pivot, and connected by a crank pin 15, fixed to the arm 13 and provided with a central bearing portion to receive an eccentric rod 16, and having a tapered conical portion 17 to fit in a corresponding opening of the arm 14 of the crank 3. The crank pin 15 is threaded beyond the conical portion to receive a nut 17ᵃ, which retains the arm 14 on the conical portion of the crank pin. The opening in the eccentric rod 16 for the reception of the crank pin 15 is preferably provided with a lining 18 of Babbitt metal, or other suitable material. The crank 4, which is arranged at right angles to the crank 3, is suitably fixed to the outer end of the section 1 of the central pivot or shaft.

The opening, which receives the crank pin 15, is arranged near the forward end of the eccentric rod, which is adjustably connected at its rear end with the return crank 19 of a main crank pin 20. The forward end 21 of the eccentric rod, which is extended in advance of the central pivot or shaft of the imparting motion device, is bifurcated to receive the rear end of an eccentric arm 22, connected to the bifurcated end of the eccentric rod by a pivot bolt 23. The crank 4 of the imparting motion device carries a crank pin or pivot 24, and is connected by a rod or link 25 with an oscillatory lever 26, pivoted at its upper end 27 to the frame of the valve gear by a pin or bolt 28. The forward end 29 of the link or rod 25 is bifurcated to straddle the oscillatory lever 26, and it is pivoted to the same at a point between the ends thereof by means of a bolt 30, piercing the sides of the bifurcation and an enlargement of the lever 26, as clearly shown in Figs. 3 and 4 of the drawings. The lower end of the depending oscillatory lever 26 is connected by a link 31 to the cross head 32 of the piston. The link 31, which is arranged in an approximately horizontal position, has its rear end 32ª bifurcated for the reception of the lower end of the lever 26, and it is pivoted to the same by a bolt 33. The cross head of the piston is connected with the said crank pin 20 by a main rod 34 of the ordinary construction. While the piston and its crank 4 of the imparting motion device are traveling at their highest longitudinal speed, the main pin and the return crank are rounding their dead centers and are at their slowest longitudinal speed or motion, and a uniform rotative speed thereby results in the imparting motion device. The imparting motion device just described is not claimed broadly in the present application, but in a companion application, executed of even date herewith, and besides securing perfect uniform rotative speed it compensates for vibration and lateral motion of the engine, which motions have no effect on the transmission of motion to the valve gear.

The eccentric arm is connected at an intermediate point by a link 25 with a rocker arm 36, constituting a portion of a bell crank, which has its other arm 37 connected with the valve rod 38. The link 35 has its lower portion 39 bifurcated to straddle the eccentric arm, and it is secured to the same by a pivot bolt 40, which pierces the sides of the bifurcated portion 39 and the eccentric arm. The upper end of the link is secured by a pivot 41 to the free end of the rocker arm 36, which is formed integral with a transverse pivot 42, having reduced terminal journals 43 and 44, arranged in suitable bearings 45 of the sides of the gear frame. The body portion of the pivot 42 extends entirely across the gear frame and fits against the inner faces of the spaced bearings 45, as clearly shown in Fig. 6 of the drawings. The arm 36 extends forwardly from the pivot 42, and the arm 37, which extends downwardly therefrom, is provided at its upper end 26 with an opening for the journal 44 and is secured to the same by a set screw 47. The lower end of the depending arm 37 is secured to the rear end of the valve rod by a suitable pivot 48.

The forward end of the eccentric arm is connected by a link 49 with a rocker arm 50, constituting an arm of a bell crank, which has its other arm 51 connected by a radius rod 52 with a reversing link 53 of the Walschaert type. The link 49 has its lower portion 54 bifurcated to straddle the front end of the eccentric rod, and it is pivoted to the same by a bolt 55. The upper end of the link 49 is arranged in the bifurcated terminal portion 56 of the rocker arm 50, and is secured to the same by a pivot bolt 57. The rocker arm 50 is also provided with a substantially U-shaped body portion, extending entirely across the gear frame and having laterally extending journals 58 and 59, arranged in suitable bearings of the sides of the gear frame. The journal or pivot 58 is extended beyond the adjacent side of the gear frame, and it forms a support for the bell crank arm 51. The bell crank arm 51 is provided at the upper end with a collar 60, which is suitably fixed to the laterally extending pivot 58 of the rocker arm. The bell crank arm 51 extends downwardly from the journal 58, and the forward end of the radius rod is secured to the lower end of the arm 51 by a pivot 61. The rear portion 62 of the radius rod 52 is forked to straddle the reversing link, which is provided with a curved longitudinal slot 63, receiving a pivot bolt 64, extending through the slot and connecting the sides of the bifurcated portion of the radius rod. The reversing link is provided at its center with a substantially L-shaped arm 65, formed integral with the reversing link and connected with the adjacent side of the gear frame by a central pivot 66 on which the reversing link swings. Any other suitable means, however, may be employed for centrally pivoting the reversing link, which is connected at its lower portion with the eccentric rod by a reciprocatory rod or member 67, secured at its rear end to the eccentric rod by a bolt 68 and pivoted at its forward end by a bolt 69 to an ear 70, formed integral with the reversing link at the lower portion thereof. As the eccentric rod travels in parallel through its connection with the imparting motion device, circular motion may be obtained from the eccentric rod at any point along the same, and the rod 67 may, therefore, be connected with the eccentric rod at any point. When the eccentric rod is reciprocated the reversing link will be oscillated. The forward end 71 of the rod 67 is bifurcated to straddle the ear 70 of the reversing link. The pivot bolt 64 also connects the rear end of the radius rod with the lower end of a rod 72, extending upwardly from the reversing link and pivoted at its upper end in a bifurcation 73 of an arm 74 of the bell crank by a bolt 75. The other arm 76 of the bell crank is connected by a rod 77 with an arm 78 of a rock shaft 79, which is connected by a reach rod 80 with a reversing lever (not shown).

The bell crank arm 74 extends rearwardly from a transverse pivot 81, having reduced terminal journals 82 and 83, mounted in suitable bearings of the gear frame. The body portion of the pivot extends across the gear frame and fits against the inner faces of the opposite bearings, and the terminal journals 82 and 83 project outwardly beyond the bearings and support the bell crank arms. The bell crank arm 74 is provided at its pivot end with a sleeve 84, which is secured to the journal 82 by a set screw 85. The other arm 76, which extends downwardly from the pivot 81, is provided at its upper end with an opening to receive the journal 83, and it is secured to the same by a set screw 86. The rod 77 has its forward end 87 bifurcated and pivoted to the arm 76 by a bolt 88. The rear end 89 of the rod 77 is bifurcated to straddle the arm 78 of the rock shaft 79, and it is pivoted to the said arm 78 at a point intermediate of the ends thereof by means of a bolt 90. The reach rod 80 is secured by a pivot 91 to the free end of the arm 78, which extends upwardly from the rock shaft 79. The reversing lever, (not shown) which is located in the cab of a locomotive, is of the usual construction and is operated in the ordinary manner to raise and lower the radius rod to shift the same from one end to the other of the radius link to reverse the engine, and to move the said rod to different points along the reversing link to vary the cut-off.

The oscillation of the reversing link through the bell crank arm 51 raises and lowers the rocker arm 50, and imparts a vertical movement to the forward end of the eccentric arm, and the combined motions, the horizontal reciprocatory and vertical, cause the intermediate pivot 40 and the end pivot 55 of the eccentric arm to travel in elliptical paths. The intermediate pivot described a perfect ellipse, that is, an ellipse where there is an equal amount of travel on each side of the center line of motion, modified by the radius of the intermediate link 55, and the end pivot described a very distorted or elongated ellipse and compensates for and dissipates the effect of the angularity of the eccentric arm. The eccentric arm has angularity, while the eccentric rod owing to its connection to the imparting motion device travels in parallel and has no angularity. Heretofore the forward end of the eccentric arm has always traveled in a fixed or true arcuate path, and the ellipse described by the intermediate pivot, which is connected with the valve actuated mechanism, was always irregular being greater on the top side of the ellipse than on the bottom side, causing unequal valve travel and unequal distribution of steam. The travel of the end pivot or end of the eccentric arm through an elliptical path enables this inequality in the ellipse to be corrected, and the modification of the ellipse of the intermediate pivot 40 through the elliptical travel of the end pivot 55 completely dissipates the effect of the angularity of the eccentric arm and produces an equal travel of the valve at the backward and forward movements, and secures uniform admission and release at each end of the cylinder and cut-off at equi-distant points at each end thereof.

Having thus fully described my invention, what I claim as new and desire to secure by Letters Patent, is:—

1. A valve gear comprising an eccentric arm, means for transmitting motion from the eccentric arm to a valve, a rocker arm, means for connecting the rocker arm with the forward end of the eccentric arm for causing such end to travel in an elliptical path, reverse mechanism including a reversing link, and a radius rod, and means for transmitting motion from the radius rod to the rocker arm.

2. A valve gear comprising an eccentric arm, means for transmitting motion from the eccentric arm to a valve, a rocker arm, means for connecting the rocker arm with the forward end of the eccentric arm for causing such end to travel in an elliptical path, reverse mechanism including a centrally pivoted reversing link, a radius rod movable along the link to opposite sides of the center thereof for reversing the engine and for varying the cut-off, and means for transmitting motion from the radius rod to the rocker arm.

3. A valve gear comprising an eccentric arm, means for transmitting motion from the eccentric arm to a valve, a rocker arm, means for connecting the rocker arm with the forward end of the said arm for causing such end to travel in an elliptical path, reverse mechanism including a reversing link, and a radius rod, means for transmitting motion from the radius rod to the rocker arm, and a reciprocatory member connected with the reversing link for oscillating the same.

4. A valve gear comprising an eccentric arm, means for transmitting motion from the eccentric arm to a valve, a rocker arm, a link connecting the rocker arm with the forward end of the eccentric arm for causing such end to travel in an elliptical path, reverse mechanism including a reversing link, and a radius rod, and means for communicating motion from the radius rod to the rocker arm.

5. A valve gear comprising an eccentric arm, means for transmitting motion from the eccentric arm to a valve, a bell crank having one of its arms constituting a rocker arm, a link connecting such rocker arm with the forward end of the eccentric arm, and reverse mechanism including a reversing link, and a radius rod connected with the other arm of the said bell crank.

6. A valve gear including an eccentric arm, mechanism located at a point intermediate of the ends thereof for transmitting motion therefrom to a valve, a bell crank having one of its arms constituting a rocker arm and located above the eccentric arm, a link connecting the rocker arm with the forward end of the eccentric arm, and reverse mechanism composed of a reversing link, and a radius rod connected with the other arm of the bell crank and with the reversing link.

7. A valve gear including an eccentric arm, an intermediate rocker arm, a link connecting the intermediate rocker arm with the eccentric arm and pivoted to the latter at a point intermediate of the ends thereof, means for transmitting motion from the said rocker arm to a valve, a forward rocker arm, means for connecting the forward rocker arm with the forward end of the eccentric arm for causing such end to travel in an elliptical path, reverse mechanism comprising a reversing link, and a radius rod connected with the link, and means for transmitting motion from the radius rod to the forward rocker arm.

8. A valve gear including an eccentric arm, a bell crank, a link connecting one arm of the bell crank with the eccentric arm and pivoted to the same at a point intermediate of the ends thereof, a valve rod connected with the other arm of the bell crank, a rocker arm, means for connecting the rocker arm with the forward end of the eccentric arm for causing such end to travel in an elliptical path, reverse mechanism comprising a reversing link, and a radius rod connected with the link, means for transmitting motion from the radius rod to the rocker arm, and a reciprocatory member connected with the reversing link for oscillating the same.

9. A valve gear including an eccentric arm, means for transmitting motion from the eccentric arm to a valve, a bell crank having one of its arms located above the forward end of the eccentric arm and constituting a rocker arm, the other arm of the bell crank depending at one side of the eccentric arm, a link connecting the rocker arm with the forward end of the eccentric arm, and reverse mechanism comprising a reversing link, and a radius rod connected with the depending arm of the bell crank and with the reversing link.

10. A valve gear including an eccentric arm, means for transmitting motion from the eccentric arm to a valve, a rocker arm, a located above the forward end of the eccentric arm and provided with a U-shaped portion having laterally extending journals, a link connecting the rocker arm with the forward end of the eccentric arm, a depending arm supported by one of the journals of the rocker arm and connected therewith, a reversing link, and a radius rod connected with the reversing link and the said depending arm.

11. A valve gear comprising an eccentric arm, means for transmitting motion from the eccentric arm to a valve, a rocker arm, a link connecting the rocker arm with the forward end of the eccentric arm for causing such end to travel in an elliptical path, reverse mechanism including a radius rod, means for transmitting motion from the radius rod to the rocker arm, a bell crank having one of its arms connected with the radius rod, and operating mechanism connected with the other arm of the bell crank.

12. A valve gear comprising an eccentric arm, means for transmitting motion from the eccentric arm to a valve, a rocker arm, a link connecting the rocker arm with the forward end of the eccentric arm for causing such end to travel in an elliptical path, reverse mechanism including a radius rod, means for transmitting motion from the radius rod to the rocker arm, a bell crank having one of its arms connected with the radius rod, a rock shaft, means for connecting the rock shaft with the other end of the bell crank, and a reach rod connected with the rock shaft.

13. A valve gear comprising an eccentric arm, means for transmitting motion from the eccentric arm to a valve, a rocker arm, a link connecting the rocker arm with the forward end of the eccentric arm for causing such end to travel in an elliptical path, reverse mechanism including a radius rod, means for transmitting motion from the radius rod to the rocker arm, a bell crank having one of its arms connected with the radius rod, a rock shaft having an arm, a rod connected with the other arm of the bell crank and with the arm of the rock shaft at a point intermediate of the ends of the same, and a reach rod connected with the end of the arm of the rock shaft.

14. A valve gear comprising an eccentric arm, means for transmitting motion from the eccentric arm to a valve, a rocker arm, a link connecting the rocker arm with the forward end of the eccentric arm for causing such end to travel in an elliptical path, reverse mechanism including a radius rod, means for transmitting motion from the radius rod to the rocker arm, a bell crank composed of a rearwardly extending arm, a depending arm, and a connecting pivot, a rod connecting the rearwardly extending arm with the radius rod, and operating mechanism connected with the depending arm of the bell crank.

15. A valve gear including an eccentric rod, mechanism connected with the eccentric rod for causing the same to travel in parallel, an eccentric arm connected with the eccentric rod, means for transmitting motion from the eccentric arm to a valve, a rocker arm, means for connecting the rocker arm with the forward end of the eccentric for causing such end to travel in an elliptical path, reverse mechanism including a radius rod, and a reversing link, means for connecting the radius rod with the rocker arm, and a reciprocatory member connected with the reversing link and with the eccentric rod.

16. In a valve gear, the combination with an eccentric rod, a rotary shaft having a plurality of crank elements, one of the crank elements being connected with the eccentric rod, mechanism for connecting the other crank element with one of the pistons of a locomotive, an eccentric arm connected with the eccentric rod, means for transmitting motion from the eccentric arm to a valve, a rocker arm, means for connecting the rocker arm with the forward end of the eccentric arm for causing such end to travel in an elliptical path, reverse mechanism including a reversing link, and a radius rod, means for transmitting motion from the radius rod to the rocker arm, and a rod connecting the reversing link with the eccentric rod.

In testimony, that I claim the foregoing as my own, I have hereto affixed my signature in the presence of two witnesses.

HENRY J. PILLIOD.

Witnesses:
CARL W. HUNT,
HARRY DE JOANNIS.